(12) United States Patent
Burguiere et al.

(10) Patent No.: US 8,740,996 B2
(45) Date of Patent: Jun. 3, 2014

(54) METHOD FOR COLORING AN OPTICAL LENS COMPRISING A PRINTING PRIMER, AND OPTICAL COLORED LENS COMPRISING SUCH A PRINTING PRIMER

(75) Inventors: Carine Burguiere, Charenton le Pont (FR); Pascal Tardieu, Charenton le Pont (FR)

(73) Assignee: Essilor International (Compagnie Generale d'Optique), Paris (FR)

( * ) Notice: Subject to any disclaimer, the term of this patent is extended or adjusted under 35 U.S.C. 154(b) by 1734 days.

(21) Appl. No.: 11/814,146

(22) PCT Filed: Jan. 25, 2006

(86) PCT No.: PCT/FR2006/000167
§ 371 (c)(1),
(2), (4) Date: Jul. 17, 2007

(87) PCT Pub. No.: WO2006/079715
PCT Pub. Date: Aug. 3, 2006

(65) Prior Publication Data
US 2008/0127432 A1    Jun. 5, 2008

(30) Foreign Application Priority Data

Jan. 25, 2005  (FR) ..................................... 05 00768

(51) Int. Cl.
*D06P 5/00*  (2006.01)
(52) U.S. Cl.
USPC ...................................... 8/507; 8/506; 8/602

(58) Field of Classification Search
USPC ............... 8/507, 602, 181, 118, 506; 351/162
See application file for complete search history.

(56) References Cited

U.S. PATENT DOCUMENTS

| | | | |
|---|---|---|---|
| 3,705,164 A * | 12/1972 | Honig et al. ................... | 524/591 |
| 4,668,240 A * | 5/1987 | Loshaek .......................... | 8/507 |
| 6,319,591 B1 | 11/2001 | Malhotra | |
| 6,416,690 B1 * | 7/2002 | Soane et al. ................... | 264/1.7 |
| 6,695,447 B1 | 2/2004 | Wexler | |
| 2002/0071091 A1 | 6/2002 | Degand et al. | |
| 2002/0138921 A1 | 10/2002 | Baillet | |
| 2002/0159160 A1* | 10/2002 | Kayanoki ..................... | 359/642 |
| 2003/0117576 A1* | 6/2003 | Thakrar et al. ................ | 351/162 |
| 2003/0184710 A1 | 10/2003 | Tucker | |
| 2004/0048073 A1 | 3/2004 | Bacon, Jr. | |
| 2004/0059045 A1 | 3/2004 | Kitchin et al. | |
| 2004/0105940 A1* | 6/2004 | Parrinello et al. ............. | 428/32.1 |
| 2004/0130676 A1* | 7/2004 | Doshi et al. ................... | 351/162 |
| 2005/0058784 A1* | 3/2005 | Kaga .......................... | 428/32.24 |
| 2005/0123697 A1* | 6/2005 | Morris et al. ............... | 428/32.34 |

FOREIGN PATENT DOCUMENTS

EP    1288012           3/2003
JP    2003324261 A *   11/2003

* cited by examiner

*Primary Examiner* — Harold Pyon
*Assistant Examiner* — Katie L Hammer
(74) *Attorney, Agent, or Firm* — Occhiuti & Rohlicek LLP

(57) ABSTRACT

The invention concerns a method for coloring an optical lens comprising a transparent printing primer, capable of being colored by inkjet printing. Said coloring method uses a technique of inkjet printing of said printing primer to obtain a colored optical lens, independently of the chemical nature of the compounds constituting the substrate of said lens. The invention also concerns the resulting colored lens.

28 Claims, No Drawings

METHOD FOR COLORING AN OPTICAL LENS COMPRISING A PRINTING PRIMER, AND OPTICAL COLORED LENS COMPRISING SUCH A PRINTING PRIMER

CROSS-REFERENCE TO RELATED APPLICATIONS

This application is being filed as a U.S. National Stage under 35 U.S.C. 371 of International Application No. PCT/FR2006/000167, filed on Jan. 25, 2006, which claims the benefit of French Application No. 05/00,768, filed Jan. 25, 2005. The contents of both applications are hereby incorporated by reference in their entirety.

A subject matter of the invention is a method for coloring an optical lens comprising a transparent printing primer which can be colored by inkjet printing. This coloring method employs a process for inkjet printing said transparent printing primer for the purpose of obtaining a tinted (or colored) optical lens, independently of the chemical nature of the constituent compounds of the substrate of said lens.

Another subject matter of the invention is a tinted (or colored) optical lens comprising said printing primer. The tinted lens is obtained by coloring said printing primer using an inkjet printer. Such tinted lenses are of use in particular in ophthalmology for cosmetic or medical reasons, or also in photography.

Conventionally, tinted (or colored) optical lenses are prepared by immersing the substrate in a thermostatically controlled bath comprising a coloring liquid, so as to obtain a tinted (or colored) substrate. This method exhibits disadvantages in terms of industrial reproducibility and possibly in terms of homogeneity to the color of the tinted lens. Moreover, the characteristics of the coloring baths and of bath temperature are specific to the chemical nature of the substrate of the lens to be colored, making it necessary to have available several formulations and processing conditions.

Methods for printing lenses using an inkjet printer were subsequently developed in order in particular to remove this constraint of dependence with regard to the chemical nature of the object to be tinted.

JP 2000-314088 (equivalent to JP3349116) describes a process for coloring lenses in which a solution of heat-curable water-soluble polymer is applied to the substrate, heating is carried out in order to obtain a cured polymer layer and then a coloring solution is applied to this layer, for example using an inkjet printer; heating is again carried out; it is then observed that the color deposited on the cured polymer layer passes inside the substrate; then the lens is rinsed, which removes the cured water-soluble polymer layer and the residual dye, in order to obtain a colored substrate.

However, this method is dependent on the chemical nature of the substrate on which the printing primer is deposited and in particular the temperature conditions of the sublimation stage have to be specifically adjusted in order to obtain a homogeneous coloring with a good cosmetic appearance.

JP 2000-3349116 describes a method for printing a lens using an inkjet printer. The difficulty in this case is to fix the ink to the lens. In order to solve this problem, this document envisages coloring, with an ink, a polymer film which will subsequently be affixed to the substrate. The ink is selected for its compatibility with the substrate and a resin which is soluble in the ink is preferably added to the ink in order to improve the attachment of the ink to the substrate. However, this method leaves a residual problem of weak diffusion of the ink. This is because, if the ink does not diffuse well into the substrate, the final appearance of the lens is not homogeneous.

There is a copious patent literature relating to the development of printing primer. These printing primers are mainly used for the printing of backings, such as paper and textile. Some documents (U.S. Pat. No. 6,695,447; US 2004/0048073; US 2004/0059045; EP 1 288 012; U.S. Pat. No. 6,319,591) mention, within their description, the use of such printing primer on transparent plastic substrates but the plastics under consideration are always films having a thickness of less than 500 µm. These films find a use in particular in presentational aids (slideshow) or packaging aids.

Other documents relate to the use of these primers on plastic supports, such as DVDs and CDs. In the latter case, the notion of transparency of the substrate and of the printing primer, and thus of the final tinted object, is not integral to the problem.

No document mentions a coloring method employing a transparent printing primer, colorable by inkjet printing, for application to transparent plastic substrates composing optical lenses and more specifically ophthalmic lenses. More specifically, no document describes such a coloring method compatible with any chemical nature of the constituent substrate of the optical lens.

The objective problem of the invention is thus to obtain a printing primer which is simultaneously stable, transparent, capable of being colored with an ink after it has been deposited on an optical lens substrate, and compatible with any chemical nature of said substrate. Finally, the tinted optical lens obtained by coating its constituent substrate by said printing primer must be optically transparent and must correspond in particular to the cosmetic criteria established for ophthalmic lenses.

The solution introduced by the Applicant Company is a coloring method employing a printing primer comprising, as base material, as binder for the printing primer, an aqueous dispersion of polymer, the receptivity to inks of this binder is enhanced by combining it with means which make it possible to improve the diffusion of the inks into said binder layer and/or with means which make it possible to enhance the properties of absorption of the inks into said binder layer.

A subject matter of the invention is thus a method for coloring an optical lens, comprising the following stages:
  a) preparation of a transparent printing primer comprising:
    (1) a binder composed of an aqueous dispersion of polymer;
    (2) an agent which enhances the diffusion of ink(s) into the aqueous dispersion of polymer, said agent comprising a colloid; and/or
    (3) an agent which enhances the absorption of ink(s) into the aqueous dispersion of polymer, said agent comprising an absorbent polymer;
  b) deposition of the transparent printing primer on at least one of the faces of the substrate of the optical lens, said face being flat, convex or concave, and formation of said film;
  c) drying the printing primer;
  d) printing, using an inkjet printer, the printing primer covering the substrate; and
  e) drying the ink.

Another subject matter of the invention is a tinted optical lens provided with such a tinted printing primer obtained according to the coloring method.

Within the meaning of the present invention:
  the term "optical lens" is understood in particular to mean ophthalmic lenses and lenses for optical instruments;

the term "ophthalmic lens" is understood to mean lenses which are fitted in particular to a spectacle frame, the role of which is to protect the eye and/or to correct the eyesight, these lenses being chosen from afocal, single vision, bifocal, trifocal and progressive lenses;

the term "substrate" is understood to mean the transparent base constituent material of the optical lens and more particularly of the ophthalmic lens. This material acts as support for the stack of one or more coatings and in particular the printing primer;

the term "coating" is understood to mean any layer or film which may be in contact with the substrate and/or with another coating and which may in particular be chosen from an antireflective, antifouling, impact-resistant, scratch-resistant and polarizing coating;

the term "tinted" (or colored) is understood to mean, of the object bearing this description, that it exhibits a degree of transmission of between 8% and 90% (class 4 to class 0 respectively), it being possible for this degree of transmission to be uniform over the whole of the lens (tinted lens) or nonuniform (gradient tint lens or lens comprising a graphic representation, such as pattern, design, character). A tinted optical lens can be tinted over all or part of its surface.

the term "optically transparent" and generally the term "transparent" in the context of the invention is understood to mean, of the object bearing this description, that it does not exhibit visible scattering and does not exhibit visible diffraction.

According to a first alternative form of the invention, the printing primer, prepared in stage a) of the coloring method, comprises an aqueous dispersion of polymer and of an absorbent polymer. Advantageously, the amount of absorbent polymer by dry weight is between 10% and 98% inclusive of the total weight of dry matter composed of the absorbent polymer and the binder.

According to a second alternative form of the invention, the printing primer, prepared in stage a) of the coloring method, comprises an aqueous dispersion of a polymer and a colloid. Advantageously, the amount of colloid is between 20% and 70% inclusive of the total weight of dry matter composed of the colloid and the binder.

According to a third alternative form of the invention, the printing primer, prepared in stage a) of the coloring method, comprises an aqueous dispersion of polymer, a colloid and an absorbent polymer. In this case, the amount of colloid by dry weight is between 20% and 40% inclusive of the total weight of dry matter and the amount of absorbent polymer by dry weight is between 5% and 40% inclusive of the total weight of dry matter, said dry matter being composed of the colloid, the absorbent polymer and the binder.

In the context of the invention, the binder is composed of an aqueous dispersion of a polymer, it being possible for the latter to be anionic, cationic or non-ionic, it being possible for said polymer to be chosen from the family of polyurethanes, poly(meth)acrylics, polyolefins, such as polybutadienes, poly(styrene/butadiene), polyesters, poly(vinylpyridines), poly(vinylpyrrolidones), poly(acrylamides), poly(meth)acrylamides and poly(vinyl esters), such as poly(vinyl acetate). Advantageously, according to the invention, the binder is chosen from an aqueous dispersion of anionic polyurethane, an aqueous dispersion of cationic polyurethane, an aqueous dispersion of anionic acrylic, an aqueous dispersion of cationic acrylic, an aqueous dispersion of anionic methacrylic, an aqueous dispersion of cationic methacrylic, an aqueous dispersion of anionic butadiene, an aqueous dispersion of cationic butadiene, an aqueous dispersion of anionic polyester and an aqueous dispersion of cationic polyester. Preferably, the aqueous dispersion of polymer is chosen from an aqueous dispersion of anionic polyurethane and an aqueous dispersion of cationic acrylic. Such aqueous dispersions of polymer are commonly referred to as "latexes".

Mention may be made, among the aqueous dispersions of polymer which can be used in the context of the invention, by way of illustration, of the polyurethanes sold by Baxenden, such as the polyurethanes of the Witcobond™ family (such as, for example, W234), or acrylates, such as the Glascol® sold by Ciba.

The absorbent polymer is chosen from hydrophilic polymers, such as polyvinyl alcohol, partially hydrolyzed poly(vinyl alcohol/vinyl acetate), polyvinylpyrrolidone, gelatine, cellulose ethers, poly(acrylic acid), poly(acrylamide) and poly(alkylene oxide). Preferably, the absorbent polymer is chosen from a polyvinylpyrrolidone and a polyvinyl alcohol. Particularly advantageously, the absorbent polymer is a polyvinyl alcohol.

The colloid, for its part, is chosen from colloids formed of inorganic oxides with a diameter of between 1 nm and 100 nm, preferably with a diameter of between 5 nm and 30 nm. According to a preferred alternative form of the invention, the colloid is an anionic colloidal silica or a cationic colloidal silica. Preferably, the colloid is an anionic colloidal silica.

Thus, in the context of the first alternative form of method for coloring an optical lens, the printing primer advantageously comprises an aqueous dispersion of polymer, said polymer being chosen from a cationic acrylic polymer and an anionic polyurethane, and an absorbent agent chosen from a polyvinylpyrrolidone and a polyvinyl alcohol.

Preferably, in the context of this first alternative form, the aqueous dispersion of polymer represents an anionic polyurethane and the absorbent polymer represents a polyvinyl alcohol. Particularly advantageously, the amount of polyvinyl alcohol is between 10% and 50% inclusive of the total weight of dry matter composed of the polyvinyl alcohol and the anionic polyurethane.

In the context of the second alternative form of the method for coloring an optical lens according to the invention, the printing primer advantageously comprises an aqueous dispersion of polymer, the latter being an anionic polyurethane, and the colloid is chosen from a cationic colloidal silica and an anionic colloidal silica. Preferably, in the context of this second alternative form, the aqueous dispersion of polymer represents an anionic polyurethane and the colloid represents an anionic colloidal silica. Particularly advantageously, the amount of colloid is between 20% and 70% inclusive, preferably between 40% and 60% inclusive, of the total weight of dry matter composed of the colloid and the aqueous dispersion of polymer. The amount of polymer which coats the silica particles has to be sufficient for the printing primer to form a film during the deposition on the substrate.

In the context of the third alternative form of the method for coloring an optical lens according to the invention, the printing primer advantageously comprises an aqueous dispersion of polymer, the latter being an anionic polyurethane, the colloid represents an anionic colloidal silica and the absorbent polymer represents a polyvinylpyrrolidone.

Additives can be added to the composition of the printing primer according to the invention and in particular light stabilizers, crosslinking agents, coalescence agents or surfactants.

According to a specific embodiment of the invention, the thickness of the printing primer layer deposited on the substrate is between 0.05 μm and 25 μm inclusive, preferably between 1 μm and 10 μm inclusive.

The substrate of the lens can be of any type. By way of indication but without implied limitation, mention may be made, as substrate which can be used in the context of the invention, of the substrates conventionally used in optics and in ophthalmia. Examples which are suitable are the substrates of the following types: polycarbonate; polyamide; polyimide; polysulfone; copolymers of poly(ethylene terephthalate) and polycarbonate; polyolefins, in particular polynorbornene; polymers and copolymers of diethylene glycol bis(allyl carbonate); (meth)acrylic polymers and copolymers, in particular (meth)acrylic polymers and copolymers derived from bisphenol A; thio(meth)acrylic polymers and copolymers; urethane and thiourethane polymers and copolymers; epoxy polymers and copolymers and episulfide polymers and copolymers.

The printing primer according to the invention simultaneously combines the optical transparency properties which are desired and properties of aptitude for coloring by inkjet printing over the whole of the ophthalmic range (class 0 to 4).

Furthermore, the printing primer according to the invention exhibits the advantage of being able to be used on any type of substrate.

Another advantage of the printing primer according to the invention is that it also makes it possible to produce a graphic representation (design, pattern and/or character) on the lens: in the context of the present invention, it is possible to obtain, due to the compatibility of said primer with the inkjet printing technique, lenses exhibiting a uniform tint, a tint gradient or at least one graphic representation, it being possible for said printing to be carried out on all or part of the surface of said lens.

Another subject matter of the invention is the use of a printing primer as described here to form a printable (and thus colorable) film at the surface of an optical lens substrate, with satisfactory adhesion for optical or ophthalmic use.

The coloring method according to the invention can additionally comprise a stage a') of treatment of the surface of the substrate before the deposition of the printing primer. The term "surface treatment" is understood to mean a chemical, heat, corona or plasma treatment. Such a treatment can be used in particular for inducing good adhesion of a coating (film or layer) to an optical lens substrate. The choice of a treatment with respect to the chemical nature is well known to a person skilled in the art.

In stage b), the deposition of the printing primer can be carried out on either face of the substrate or on both faces of the substrate, it being possible for the faces to be flat, concave or convex. All the deposition processes known for applying a solution to a substrate are suitable for stage b) of a process according to the invention. Deposition by spin coating (or centrifuging) is particularly preferred in the case where it is desired to coat only a single face of the optical lens; deposition by dip coating (immersion) may also be preferred in particular if it is desired to coat, at the same time, both faces of the substrate, in all or part.

In stages c) and e), the drying of the primer and of the ink can be carried out according to standard conditions known to a person skilled in the art within temperature ranges varying from ambient temperature (25° C.) to a temperature which can reach 150° C., for a period of time varying from 10 minutes to 2 hours. As nonlimiting example, stage e) can consist in drying the ink for 1 hour at 100° C.

The method for coloring an optical lens according to the invention relates to the coloring of a printing primer as defined above, deposited on the substrate of said optical lens, using an inkjet printer. The coloring method as described in the context of the invention is compatible with all types of inkjet printers conventionally used in the context of office automation or photographic applications. A person skilled in the art will mainly choose a category of inkjet printer according to the level of resolution of reproductions of the image which he desires. Thus, for example, a high-resolution inkjet printer of photographic quality will preferably be used in the case where it is desired to obtain a tinted optical lens comprising, by way of coloration, a fine and detailed graphic representation, such as, for example, a photographic image. For the production of a uniformly tinted lens or gradient tint lens, an inkjet printer of office automation type is sufficient to allow an object corresponding to the criterion of optical cosmetic to be obtained.

According to a specific embodiment of the invention, printing software is used in stage d) of the process: any software suitable for the printing of the printable surface with texts, designs, patterns or photographs can be used in the context of the invention.

Another subject matter of the invention is a tinted optical lens obtained by the coloring method employing a printing primer as defined above. Particularly advantageously, the optical lens is an afocal, single vision, bifocal, trifocal or progressive ophthalmic lens.

The present invention will be better understood on reading the examples which follow and which illustrate, in nonlimiting fashion, the subject matter of the invention.

EXAMPLE 1

Coloring by a Blue Color Gradient of an Optical Lens

Inkjet printer: Canon i865
Primer:
Binder: anionic polyurethane: 40% W234 (Baxenden)
Colloid: anionic colloidal silica: 60% Ludox TM40 (Aldrich)

The primer solution is prepared by mixing the W234 with the colloidal silica with magnetic stirring. After stirring for one hour, the printing primer obtained is deposited by spin coating on an Orma™ biplane substrate. The spin coating conditions are 500 revolutions/20 seconds. The primer is dried in an oven at 100° C. for 1 h. The thickness of the primer is 3.6 µm. Once the printing primer has been dried, the optical lens comprising the printing primer and the substrate can be printed (colored) with the Canon i865 printer. The blue gradient is formed using Powerpoint™ software. The optical lens is charged to the loading module of the printer, the latter being connected to the computer comprising the "blue gradient" file under Powerpoint™. Printing is carried out. When the lens exits from the printer, it is immediately dried at 100° C. for 1 h. An optical lens with a blue gradient, corresponding to the cosmetic criterion in terms of optical transparency, is obtained.

EXAMPLE 2

Coloring by a Graphic Representation of Photography Type of an Optical Lens

Inkjet printer: Canon i865
Primer:
Binder: anionic polyurethane: 70% W234 (Baxenden)
Absorbent polymer: polyvinyl alcohol (molar mass=13000-23000 g/mol; degree of hydrolysis: 87-89%) 30% PVOH13 (Aldrich)

An aqueous solution of polyvinyl alcohol with a concentration of 10% by weight is prepared by dissolving PVOH13 in water at 95° C. for 2 hours with stirring. The primer solution is subsequently prepared by mixing W234 with the aqueous solution of PVOH13 with magnetic stirring. After stirring for one hour, the primer is deposited by spin coating on an Orma™ biplane substrate. The spin coating conditions are 500 revolutions/15 seconds. The primer is dried in an oven at 100° C. for 1 h. The thickness of the primer is 3.6 µm. The optical lens comprising the printing primer and the substrate can be printed (colored) with the Canon i865 printer. The photograph to be printed is inserted into a Word™ document. The optical lens is charged to the loading module of the printer, the latter being connected to the computer comprising the "photograph" file under Word™. Printing is carried out. When the lens exits from the printer, it is immediately dried at 100° C. for 1 h. An optical lens tinted by a photograph, corresponding to the cosmetic criterion in terms of optical transparency, is obtained.

What is claimed is:

1. A method for coloring an optical lens, comprising the following stages:
   a) providing a printing primer composition comprising:
      (1) a binder composed of an aqueous dispersion of a polymer selected from anionic polyurethanes; and at least one of
      (2) a hydrophilic inorganic colloid; and
      (3) a hydrophilic polymer;
   b) deposition of the printing primer composition on at least one of the faces of the substrate of the optical lens, said face being flat, convex or concave;
   c) drying the printing primer composition, thereby forming a transparent printing primer film;
   d) printing, using an inkjet printer, the dried transparent printing primer film covering the substrate; and
   e) drying the ink.

2. The coloring method as claimed in claim 1, characterized in that the printing of stage d) of the transparent printing primer film consists of printing a uniform tint, a gradient tint or a graphic representation using an inkjet printer coupled to software for the processing of text or graphic representation.

3. The coloring method as claimed in claim 1, characterized in that the deposition of stage b) of the printing primer composition is carried out by spin coating (centrifuging) on one of the faces of the substrate of the optical lens.

4. The coloring method as claimed in claim 1, characterized in that the deposition of stage b) of the printing primer composition is carried out by dip coating (immersion) on both faces of the substrate of the optical lens.

5. The coloring method as claimed in claim 1, characterized in that the drying stages c) and e) are carried out at temperatures of between 25° C. and 150° C. for a time of between 10 minutes and 2 hours.

6. The coloring method as claimed in claim 1, characterized in that the printing primer composition comprises an aqueous dispersion of a polymer selected from anionic polyurethanes and a hydrophilic polymer.

7. The coloring method as claimed in claim 1, characterized in that the printing primer composition comprises an aqueous dispersion of a polymer selected from anionic polyurethanes and a hydrophilic inorganic colloid.

8. The coloring method as claimed in claim 1, characterized in that said hydrophilic polymer is chosen from polyvinyl alcohol, partially hydrolyzed poly(vinyl alcohol/vinyl acetate), polyvinylpyrrolidone, gelatine, cellulose ethers, poly(acrylic acid), poly(acrylamide) and poly(alkylene oxide).

9. The coloring method as claimed in claim 8, characterized in that the hydrophilic polymer is chosen from a polyvinylpyrrolidone and a polyvinyl alcohol.

10. The coloring method as claimed in claim 8, characterized in that the hydrophilic polymer is a polyvinyl alcohol.

11. The coloring method as claimed in claim 1, characterized in that the hydrophilic inorganic colloid has a diameter between 1 nm and 100 nm.

12. The coloring method as claimed in claim 11, characterized in that the hydrophilic inorganic colloid has a diameter of between 5 nm and 30 nm.

13. The coloring method as claimed in claim 11, characterized in that the hydrophilic inorganic colloid is chosen from an anionic colloidal silica and a cationic colloidal silica.

14. The coloring method as claimed in claim 13, characterized in that the hydrophilic inorganic colloid is an anionic colloidal silica.

15. The coloring method as claimed in claim 1, characterized in that the aqueous dispersion of polymer is an aqueous dispersion of anionic polyurethane and the hydrophilic polymer is chosen from polyvinylpyrrolidone and polyvinyl alcohol.

16. The coloring method as claimed in claim 15, characterized in that the aqueous dispersion of polymer is an aqueous dispersion of an anionic polyurethane and the hydrophilic polymer is polyvinyl alcohol.

17. The coloring method as claimed in claim 1, characterized in that the aqueous dispersion of polymer is an aqueous dispersion of an anionic polyurethane and the hydrophilic inorganic colloid is chosen from a cationic colloidal silica and an anionic colloidal silica.

18. The coloring method as claimed in claim 17, characterized in that the aqueous dispersion of polymer is an aqueous dispersion of an anionic polyurethane and the hydrophilic inorganic colloid is an anionic colloidal silica.

19. The coloring method as claimed in claim 1, characterized in that the aqueous dispersion of polymer is an anionic polyurethane, the hydrophilic inorganic colloid is an anionic colloidal silica and the hydrophilic polymer is polyvinylpyrrolidone.

20. The coloring method as claimed in claim 6, characterized in that the amount of hydrophilic polymer by dry weight is between 10% and 98% inclusive, relative to the total weight of dry matter composed of the hydrophilic polymer and the polymer of the aqueous dispersion.

21. The coloring method as claimed in claim 20, characterized in that the amount of polyvinyl alcohol by dry weight is between 10% and 50% inclusive, relative to the total weight of dry matter composed of the polyvinyl alcohol and the anionic polyurethane.

22. The coloring method as claimed in claim 7, characterized in that the amount of hydrophilic inorganic colloid by dry weight is between 20% and 70% inclusive, relative to the total dry weight of dry matter composed of the hydrophilic inorganic colloid and the polymer of the aqueous dispersion.

23. The coloring method as claimed in claim 21, characterized in that the amount of hydrophilic inorganic colloid by dry weight is between 40% and 60% inclusive, relative to the total dry weight of dry matter composed of the hydrophilic inorganic colloid and the polymer of the aqueous dispersion.

24. The coloring method as claimed in claim 1, characterized in that the amount of hydrophilic inorganic colloid by dry weight is between 20% and 40% inclusive, relative to the total weight of dry matter and the amount of hydrophilic polymer by dry weight is between 5% and 40% inclusive, relative to the total weight of dry matter, said dry matter being composed of the hydrophilic inorganic colloid, the hydrophilic polymer and the binder.

25. A tinted optical lens obtained according to the coloring method comprising a transparent printing primer film as claimed in claim 1.

26. The optical lens as claimed in claim 25, in which the transparent printing primer film is a coating with a thickness of between 0.05 μm and 25 μm inclusive.

27. The optical lens as claimed in claim 25, in which the transparent printing primer film is a coating with a thickness of between 1 μm and 10 μm inclusive.

28. The optical lens as claimed in claim 25, characterized in that it is an afocal, single vision, bifocal, trifocal or progressive ophthalmic lens.

* * * * *